United States Patent

Schwager et al.

Patent Number: 5,519,090
Date of Patent: May 21, 1996

[54] HIGH-FLOW BLEND OF DIFFERENT PROPYLENE POLYMERS

[75] Inventors: Harald Schwager, Speyer; Klaus-Dieter Hungenberg, Birkenau, both of Germany

[73] Assignee: BASF Aktiengesellschaft, Ludwigshafen, Germany

[21] Appl. No.: 334,452

[22] Filed: Nov. 4, 1994

Related U.S. Application Data

[63] Continuation of Ser. No. 894,318, Jun. 4, 1992, abandoned.

[30] Foreign Application Priority Data

Jun. 12, 1991 [DE] Germany ............... 41 19 283.4

[51] Int. Cl.$^6$ ............... C08L 23/10; C08L 23/16
[52] U.S. Cl. ............... 525/240; 525/88; 525/322; 525/323; 525/247
[58] Field of Search ............... 525/240, 88, 323, 525/322

[56] References Cited

U.S. PATENT DOCUMENTS

| | | | |
|---|---|---|---|
| 3,472,829 | 10/1969 | Claybaugh et al. | 525/240 |
| 4,211,690 | 7/1980 | Asano et al. | 525/89 |
| 4,454,299 | 6/1984 | Schweier et al. | 525/33 |
| 4,455,405 | 6/1984 | Jaggard | 525/53 |
| 4,499,247 | 2/1985 | Chiba et al. | 526/142 |
| 4,500,682 | 2/1985 | Chiba et al. | 526/348 |
| 4,550,145 | 10/1985 | Kasahara et al. | 525/323 |
| 5,055,528 | 10/1991 | Kioka et al. | 525/88 |
| 5,141,994 | 8/1992 | Kakugo et al. | 525/88 |

FOREIGN PATENT DOCUMENTS

| | | |
|---|---|---|
| 355603 | 2/1990 | European Pat. Off. |
| 60-49009 | 3/1985 | Japan . |
| 60-49008 | 3/1985 | Japan . |
| 843563 | 5/1984 | South Africa . |
| 843561 | 5/1984 | South Africa . |
| 845261 | 7/1984 | South Africa . |
| 1032945 | 6/1966 | United Kingdom . |

*Primary Examiner*—Carman J. Seccuro, Jr.
*Attorney, Agent, or Firm*—Keil & Weinkauf

[57] ABSTRACT

Propylene polymer blends containing a) a propylene homopolymer having a melt flow index of from 0.001 to 5 g/10 min, as determined at 230° C. under a load of 2.16 kg, b) a propylene/ethylene copolymer having an ethylene content of from 5 to 80% w/w, and c) a propylene homopolymer having a melt flow index of from 1 to $10^4$ g/10 min, as determined at 230° C. under a load of 2.16 kg, the ratio of the melt flow index of the propylene homopolymer c) to that of the propylene homopolymer a) being within the range 10:1 to $10^7$:1.

The blends of the invention are high-flow materials showing a broad molecular weight distribution, and are thus readily processible.

3 Claims, No Drawings

HIGH-FLOW BLEND OF DIFFERENT PROPYLENE POLYMERS

This application is a continuation of application Ser. No. 07/894,318, filed on Jun. 4, 1992, now abandoned.

The present invention relates to propylene polymer blends containing a) a propylene homopolymer having a melt flow index of from 0.001 to 5 g/10 min, as determined at 230° C. under a load of 2.16 kg, b) a propylene/ethylene copolymer having an ethylene content of from 5 to 80% w/w, and c) a propylene homopolymer having a melt flow index of from 1 to $10^4$ g/10 min, as determined at 230° C. under a load of 2.16 kg, the ratio of the melt flow index of the propylene homopolymer c) to that of the propylene homopolymer a) being within the range 10:1 to $10^7$:1.

The invention also relates to processes for the preparation of the blends of the invention and to sheet, film and molded articles made therefrom.

The properties of polymers can be varied by the admixture of other polymers, giving polymer blends. For example, the properties of hard, heat-resistant polymers may be combined with those of soft, elastic polymers by mixing said polymers to give blends showing a favorable combination of the desirable properties of both polymers (Saechtling, Kunststoff-Handbuch, Carl Hanser Verlag, Munich, p. 8 [1986]). Blending two or more polyolefins can produce products which may, for example, exhibit opposing properties such as high impact strength combined with high rigidity.

Certain propylene/ethylene copolymers can also show a combination of different properties, in particular high impact strength combined with adequate rigidity. These can be produced using Ziegler-Natta catalysts (U.S. Pat. Nos. 4,454,299, 4,455,405, ZA-B 0084/3561, ZA-B 0084/3563, ZA-B 0084/5261, EP-A 355,603, GB-A 1,032,945,) in which gaseous propylene is first polymerized in a first reaction zone and the resulting homopolymer is then passed to a second reaction zone where a mixture of ethylene and propylene is polymerized and added, in the form of polymerized units, to said homopolymer. The process is generally carried out at an elevated pressure and in the presence of hydrogen acting as chain stoppage regulator. Those copolymers of relatively high molecular weight are particularly prone to have good mechanical properties, especially high rigidity. On the other hand, however, their flow properties are poor, and this impairs their processibility on the equipment normally used in the plastics industry. Those copolymers having lower molecular weights, however, frequently have unsatisfactory mechanical properties although their flow and processing properties are good.

It is thus an object of the invention to overcome the aforementioned drawbacks by providing polymers which have good flow properties and are therefore readily processible but which also have good mechanical properties, in particular high rigidity.

Accordingly, we have found the novel propylene polymer blends defined above.

The blends of the invention contain a) a propylene homopolymer having a melt flow index of from 0.001 to 5 g/10 min, preferably from 0.01 to 2 g/10 min, as determined at 230° C. under a load of 2.16 kg. The melt flow index is taken to be the quantity of polymer which is discharged from a tester as specified in DIN 53,735 over a period of 10 minutes under a load of 2.16 kg and at a temperature of 230° C. The other constituents of the blends of the invention are a propylene/ethylene copolymer b) having an ethylene content of from 5 to 80% w/w, preferably from 20 to 75% w/w, and a propylene homopolymer c) having a melt flow index of from 1 to $10^4$ g/10 min, preferably from 1 to $10^3$ g/10 min, as determined at 230° C. under a load of 2.16 kg. These constituents are advantageously present in such proportions that the blend of the invention contains from 40 to 97% w/w of propylene homopolymers a) and c) and from 3 to 60% w/w of propylene/ethylene copolymer b). Particular preference is given to blends which contain from 50 to 95% w/w of propylene homopolymers a) and c) and from 5 to 50% w/w of propylene/ethylene copolymer b).

Another essential feature of the blend of the invention is that the melt flow indices of the propylene homopolymers a) and c), as determined at 230° C. under a load of 2.16 kg, differ from each other by a factor of at least 10. The ratio of the melt flow index of the propylene homopolymer c) to that of the propylene homopolymer a) is in the range of 10:1 to $10^7$:1, preferably 10:1 to $10^5$:1. Particular preference is given to blends of the invention in which the ratio of the melt flow index of the relatively high-flow propylene homopolymer c) to that of the relatively low-flow propylene homopolymer a) is in the range of 10:1 to $10^3$:1.

The ratio of the weight of propylene homopolymer a) to that of the propylene homopolymer c) usually ranges from 0.1:1 to 20:1. The ratio of the weight of propylene homopolymer a) to that of the propylene homopolymer c) is preferably in the range of 0.15:1 to 15:1 and more preferably in the range of 0.2:1 to 10:1.

The polymers present in the blend of the invention, i.e. the relatively high-flow propylene homopolymer c), the relatively low-flow propylene homopolymer a) and the propylene/ethylene copolymer b), are all obtainable by polymerizations using Ziegler-Natta catalysts in polymerization reactors as commonly used in the plastics industry. Such polymerization can be carried out in solution, in suspension, or in the gas phase, gas-phase polymerization being preferred. The Ziegler-Natta catalysts used generally consist of a solid component, which contains titanium, magnesium, a halogen, and an electron donating compound, an aluminum component, and a further electron donating component.

The titanium compounds used for preparation of the titaniferous solid component are generally halides or alcoholates of trivalent or tetravalent titanium, preference being given to the chlorides of titanium, especially titanium tetrachloride. The titaniferous solid component advantageously includes a finely divided substrate, for which purpose the following materials have given good results: silicon oxides, aluminum oxides, and aluminum silicates of the empirical formula $SiO_2 \cdot aAl_2O_3$, where a stands for a value between 0.001 and 2, preferably between 0.01 and 0.5.

Substrates which are preferably used are those having a particle diameter of from 0.1 to 1000 μm, especially from 10 to 300 μm, a pore volume of from 0.1 to 10 cm³/g, especially from 1.0 to 5.0 cm³/g, and a surface area of from 10 to 1000 m²/g, especially from 100 to 500 m²/g.

Among other materials used for the formation of the titaniferous solid component are magnesium compounds. Examples of suitable magnesium compounds are, in particular, magnesium halides, magnesium alkyls, and magnesium aryls, also magnesium alkoxy compounds and magnesium aryloxy compounds, and the preferred compounds are magnesium dichloride, magnesium dibromide, and di($C_1$–$C_{10}$-alkyl)magnesium compounds. The titaniferous solid component may also contain halogen, preferably chlorine or bromine.

The titaniferous solid component also contains electron donating compounds, for example monofunctional or polyfunctional carboxylic acids, carboxylic anhydrides, and carboxylic esters, or ketones, ethers, alcohols, lactones, and phosphorus-organic and silicon-organic compounds. Preferred electron donors in the titaniferous solid component are phthalic derivatives of the general formula I:

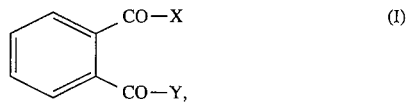

in which X and Y individually denote chlorine or a $C_1$–$C_{10}$-alkoxy radical or are both oxygen. Particularly preferred electron donating compounds are phthalates in which X and Y each denote a $C_1$–$C_8$-alkoxy radical, for example methoxy, ethoxy, propoxy, or butoxy.

Other preferred electron donating compounds in the titaniferous solid component are, for example, diesters of 3-membered or 4-membered, optionally substituted cycloalkyl-1,2-dicarboxylic acids, and monoesters of optionally substituted benzophenone-2-carboxylic acids. The hydroxy compounds used for the synthesis of such esters are the alcohols normally employed in esterifications, for example $C_1$–$C_{15}$-alkanols, $C_5$–$C_7$-cycloalkanols, which may in turn carry $C_1$–$C_{10}$-alkyl groups, and also $C_6$–$C_{10}$ phenols.

The titaniferous solid component can be manufactured by known methods, examples of which are described in EP-A 45,975, EP-A 45,977, EP-A 86,473, EP-A 171,200, GB-A 2,111,066, and U.S. Pat. No. 4,857,613.

The following three-stage procedure is preferably used for the manufacture of the titaniferous solid component.

In the first stage, a finely divided substrate, preferably $SiO_2 \cdot aAl_2O_3$ (where a stands for a value from 0.001 to 2, preferably from 0.01 to 0.5) is mixed with a solution of the magnesium-containing compound in a liquid alkane, and the resulting mixture is stirred for from 0.5 to 5 hours at a temperature of from 10° to 120° C. The amount of magnesium compound used is preferably from 0.1 to 1 mole per mole of substrate. With continuous stirring, a halogen or hydrogen halide, preferably chlorine or hydrogen chloride, is then added in a molar excess of from at least two times, and preferably at least five times, the molar amount of magnesium compound. Following an interim period of from about 30 to 120 minutes, the solid is removed from the liquid phase.

In the second stage, the product obtained in the first stage is added to a liquid alkane, and to this mixture there is then added a $C_1$–$C_8$-alkanol, preferably ethanol, a halide or alcoholate of trivalent or tetravalent titanium, preferably titanium tetrachloride, and an electron donating compound. For each mole of magnesium in the solid material produced in the first stage, there are added from 1 to 5 moles, preferably from 2 to 4 moles, of alkanol, from 2 to 20 moles, preferably from 4 to 10 moles, of trivalent or tetravalent titanium, and from 0.01 to 1 mole, preferably from 0.1 to 1.0 mole, of electron donating compound. This mixture is then stirred for at least one hour at a temperature of from 10° to 150° C., after which the resulting solids are isolated by filtration and washed with a liquid alkane, preferably hexane or heptane.

In the third stage, the solids obtained in the second stage are extracted for several hours at a temperature of from 100° to 150° C. with excess titanium tetrachloride or a solution, present in excess, of titanium tetrachloride in an inert solvent, preferably an alkylbenzene, the concentration of titanium tetrachloride in this solution being at least 5% w/w.

The product is then washed with a liquid alkane until the content of titanium tetrachloride in the washings falls below 2% w/w.

The titaniferous solid component thus obtained is used in combination with a co-catalyst to form the Ziegler-Natta catalyst system. Suitable co-catalysts are aluminum compounds and electron donating compounds.

Suitable aluminum compounds for use as co-catalysts are trialkylaluminum and compounds of this type in which one of the alkyl groups is replaced by an alkoxy group or by a halogen atom such as a chlorine or bromine atom. We prefer to use trialkylaluminum compounds in which the alkyl groups contain from 1 to 8 carbon atoms, e.g. trimethylaluminum, triethylaluminum, and methyldiethylaluminum.

We prefer to use an electron donating compound as a further co-catalyst in addition to the above aluminum compound, examples of which are monofunctional or polyfunctional carboxylic acids, carboxylic anhydrides, carboxylates, ketones, ethers, alcohols, lactones, phosphorus-organic compounds, and silicon-organic compounds. Preferred electron donors are silicon-organic compounds of the general formula II

in which $R^1$ is variously a $C_1$–$C_{20}$-alkyl group, a 5-membered to 7-membered cycloalkyl group, which may in turn be substituted by a $C_1$–$C_{10}$-alkyl group, or a $C_6$–$C_{20}$-aryl group, or a $C_6$–$C_{20}$-arylalkyl group; $R^2$ variously denotes a $C_1$–$C_{20}$-alkyl group; and n is equal to 1, 2, or 3. Those compounds are particularly preferred in which $R^1$ is a $C_1$–$C_8$-alkyl group or a 5-membered to 7-membered cycloalkyl group, $R^2$ is a $C_1$–$C_4$-alkyl group, and n is equal to 1 or 2.

Of these compounds, the following are particularly noteworthy: dimethoxydiisopropylsilane, dimethoxyisobutylisopropylsilane, dimethoxydiisobutylsilane, dimethoxydicyclopentylsilane, and diethoxyisobutylisopropylsilane.

Use is preferably made of catalyst systems in which the atomic ratio of the aluminum in the aluminum compound to the titanium in the titaniferous solid component is from 10:1 to 800:1, more preferably from 20:1 to 200:1, and the molar ratio of the aluminum compound to the electron donor used as co-catalyst is from 1:1 to 100:1, more preferably from 2:1 to 80:1. The catalyst components may be fed to the polymerization system either individually, in any order, or as a mixture of two components.

Such Ziegler-Natta catalyst systems may be used in conventional polymerization reactors for the preparation of the polymers to be included in the blends of the invention. If such polymerization is carried out in the gas phase, it is recommended that the reactors be packed with a finely divided polymer, for example a polyolefin, and that suitable stirring means be provided. The molecular weight of the polymers thus produced can be controlled by the use of chain stoppage regulators as conventionally employed in polymerization engineering, for example hydrogen.

The propylene homopolymers a) and c) are preferably formed in the gas phase by one-stage polymerization at a temperature of from 50° to 110° C. and a pressure of from 10 to 50 bar, the average residence time being from 0.2 to 5 hours. The preferred conditions comprise temperatures of from 60° to 100° C., pressures of from 15 to 40 bar, and average residence times of from 0.2 to 4 hours. To increase the melt flow index, and thus to improve the flow, of the product, chain stoppage regulators, especially hydrogen, are used, particularly in the case of the propylene homopolymer c). The propylene homopolymers a) and c) may also contain small quantities of other $C_2$–$C_{10}$-alk-1-enes, particularly ethylene, but-1-ene, pent-1-ene, or hex-1-ene, in which case the ratio of the partial pressure of the $C_2$–$C_{10}$-alk-1-ene to that of the propylene will not usually be greater than 1:100, and is preferably not greater than 0.5:100.

The manufacture of the propylene/ethylene copolymer b) is preferably also carried out by Ziegler-Natta polymerization, preferably from the gas phase and in the presence of a stirred packing of finely divided polymer and in the presence of a chain stoppage regulator, in particular hydrogen. Propylene and ethylene are thus copolymerized, the temperatures used ranging from 40° to 110° C., the pressures from 5 to 50 bar, and the average residence times from 0.2 to 5 hours. The preferred conditions are temperatures of from 50° to 100° C., pressures from of 6 to 40 bar, and average residence times of from 0.2 to 4 hours. The ratio of the partial pressure of the propylene to that of the ethylene is usually within the range of 20:1 to 1:20 and is preferably in the range of 15:1 to 1:15. The resulting propylene/ethylene copolymer may also contain minor quantities of $C_4$–$C_{10}$-alk-1-enes, for example but-1-ene, pent-1-ene, or hex-1-ene. Here again, the ratio of the partial pressure of the said $C_4$–$C_{10}$-alk-1-enes to the propylene is generally not greater than 1:100 and is preferably not greater than 0.5:100.

The blends of the invention are prepared by suitably mixing the propylene homopolymers a) and c) and the propylene/ethylene copolymer b). Generally speaking, this can take place in equipment conventionally used for blending materials in the plastics industry, for example in a barrel mixer, a mill, a screw extruder, a Diskpack screwless extruder, a roller mill, or a kneader, or in a stirred polymerization reactor. Blending is usually carried out at a temperature of from 30° to 280° C., preferably from 50° to 250° C., and at a pressure of from 1 to 100 bar, preferably from 2 to 50 bar. The average residence time of the polymers to be blended is governed by the type of mixer used. In the case of extruders, the mixing time will usually be from 0.2 to 10 minutes, preferably from 0.5 to 5 minutes, but these average residence times may be considerably longer when use is made of other mixing equipment.

According to a special embodiment of a process yielding the blends of the invention, the propylene homopolymers a) and c) and the propylene/ethylene copolymer b) are prepared by a three-stage polymerization process. in this process, propylene is polymerized from the gas phase in a first polymerization stage with the aid of a Ziegler-Natta catalyst, after which the resulting propylene homopolymer is passed, together with the catalyst, to a second polymerization stage, in which propylene is again polymerized. Appropriate control of the polymerization conditions in the first and second polymerization stages will produce either the propylene homopolymer a) or the propylene homopolymer c), and it is immaterial which propylene homopolymer is formed in which polymerization stage. The precise polymerization conditions used will in any case correspond to those required for separate production of said propylene homopolymers a) and c), so that reference can be made to the above remarks relating thereto. In the following, third polymerization stage, a mixture of propylene and ethylene is polymerized and added, in the form of polymerized units, to said propylene homopolymers a) and c). Here again, the exact polymerization conditions used correspond to those described above with respect to the manufacture of the propylene/ethylene copolymer b). It only remains to add that the proportions of the various polymers, i.e. of the propylene homopolymers a) and c ) produced in the first polymerization stage and of the propylene/ethylene copolymer produced in the second polymerization stage, can be varied by varying the ratio of the weights of monomer convened in the various polymerization stages to each other. Normally, the ratio of the weight of monomer converted in the first polymerization stage to that of monomer converted in the second polymerization stage ranges from 20:1 to 1:20, preferably from 10:1 to 1:10, whilst the ratio of the weight of monomer converted in the first two polymerization stages together to that of monomer converted in the third polymerization stage ranges from 50:1 to 0.5:1, preferably from 40:1 to 1:1.

In this three-stage procedure, it is also possible to include a $C_1$–$C_8$-alkanol, in particular a $C_1$–$C_4$-alkanol, in the reaction mixture of the third polymerization stage. Such an alkanol influences the activity of the Ziegler-Natta catalyst. Highly suitable alkanols for this purpose are, inter alia, methanol, ethanol, n-propanol, n-butanol, and especially isopropanol. The amount of $C_1$–$C_8$-alkanol added should be such that the molar ratio of the aluminum compound in the catalyst system to the $C_1$–$C_8$-alkanol is within the range of 0.1:1 to 10:1, preferably 0.2:1 to 5:1.

Another method of producing the blends of the invention comprises reacting a polymer blend I: of a propylene homopolymer a) and propylene/ethylene copolymer b) with a propylene homopolymer c), or reacting a polymer blend II of a propylene homopolymer c) and propylene/ethylene copolymer b) with a propylene homopolymer a). These reactions are carried out in mixing equipment such as is conventionally used in the plastics industry, the temperatures used being from 30° to 280° C., preferably from 50° to 250° C., and the pressures from 1 to 100 bar, preferably from 1 to 50 bar.

Yet another possibility is to react the polymer blend I or II with another blend of two different propylene homopolymers, which need not be identical to the propylene homopolymers a) and c) in the polymer blends I and II.

The manufacture of the polymer blends I and II will usually take place by two-stage polymerization, again using a Ziegler-Natta catalyst system, propylene being polymerized in a first polymerization stage in the same way as described above for the production of the propylene homopolymers a) and c), after which the resulting mixture of propylene homopolymer a) or c) and catalyst is passed to the second polymerization stage, where a mixture of propylene and ethylene is polymerized and added, in the form of polymerized units, to said propylene homopolymer in the manner described above for the production of the propylene/ethylene copolymer b). The actual conditions of polymerization are similar to those used for the production of the individual polymers by the single-stage processes. Usually, the ratio of the weight of monomer converted in the first polymerization stage to that of monomer converted in the second polymerization stage will be in the range of 50:1 to 0.5:1, preferably from 40:1 to 1:1.

Here again, it is possible to include a $C_1$–$C_8$-alkanol, in particular a $C_1$–$C_4$-alkanol, in the reaction mixture of the second polymerization stage to influence the activity of the Ziegler-Natta catalyst. Highly suitable alkanols for this purpose are, inter alia, methanol, ethanol, n-propanol, n-butanol, and especially isopropanol. The amount of $C_1$–$C_8$-alkanol added should be such that the molar ratio of the aluminum compound to the $C_1$–$C_8$-alkanol is within the range of 0.1:1 to 10:1, preferably 0.2:1 to 5:1.

The blends of different propylene copolymers proposed by the invention are characterized by high flow properties, which render them easy to process. The melt flow indices range from 0.1 to 100 g/10 min, preferably from 0.1 to 50 g/10 min, as determined at 230° C. under a load of 2.16 kg.

The blends of the invention are suitable inter alia for the production of sheet, film and molded articles for which ease of processibility is an important factor.

EXAMPLES

I. Manufacture of blends of the invention by combining polymer blends II with propylene homopolymers a)

Examples 1 to 4

A. Manufacture of polymer blends II

The production of the polymer blends II was carried out in two in-line stirred autoclaves each having a capacity of 200 l, in the presence of hydrogen acting as chain stoppage regulator. Both stirred autoclaves contained an agitated fixed bed of finely divided polypropylene.

Gaseous propylene was fed to the first polymerization reactor at a pressure of 32 bar and a temperature of 80° C. and was continuously polymerized therein with the aid of a Ziegler-Natta catalyst. The catalyst components comprised 1 g/h of a titaniferous solid component, 60 mmoles/h of triethylaluminum, and 6 mmoles/h of dimethoxyisobutyl-isopropyl-silane. The average residence time of the reaction mixture was about 2 hours. This process produced 0.3 kg of polypropylene per mmole of aluminum compound. The titaniferous solid component was made by the following procedure.

In a first stage, butyloctylmagnesium dissolved in n-heptane was added to $SiO_2$ having a particle diameter of from 20 to 45 µm, a pore volume of 1.75 $cm^3$/g and a surface area of 320 $m^2$/g, the amount of magnesium compound used being 0.3 mole per mole of $SiO_2$. The solution was stirred for 1.5 hours at 90° C. and then cooled to 20° C. Hydrogen chloride was then bubbled in until the molar amount fed was ten times that of the magnesium-organic compound. After 30 minutes, the solid product was separated from the solvent.

n-Heptane was added to the product obtained in the first stage, after which 3 moles of ethanol were added with constant stirring, per mole of magnesium. This mixture was stirred for 1.5 hours at 80° C., following which 6 moles of titanium tetrachloride and 0.5 mole of di-n-butyl phthalate were added, per mole of magnesium. The reaction mixture was stirred for a further two hours, after which the solids were separated from the solvent by filtration.

The resulting product was extracted for two hours at 125° C. with a 15% w/w solution of titanium tetrachloride in ethylbenzene. The solids were then separated from the extracting agent by filtration and washed with n-heptane until the washings contained not more than 0.3% w/w of titanium tetrachloride.

The titaniferous solid component thus obtained contained 3.1% w/w of titanium, 7.5% w/w of magnesium, and 28.3% w/w of chlorine.

The propylene homopolymer formed in the first reactor was then passed, together with the catalyst, to the second stirred autoclave, where a mixture of propylene and ethylene was polymerized and added in the form of polymerized units to said polymer. The actual reaction conditions used in this second polymerization stage, in Examples 1 to 4, i.e. the pressure, the temperature, the ratio of the partial pressure of the propylene to that of the ethylene, the ethylene content of the propylene/ethylene copolymer b) formed in this stage, the ratio of the weight of monomer converted in the first polymerization stage to that of monomer converted in the second polymerization stage, and the molar ratio of the aluminum component to the isopropanol, are listed in Table 1 below, which also contains the melt flow indices of the propylene homopolymer c) obtained in the first polymerization stage and of the polymer blend II obtained on conclusion of the second polymerization stage.

TABLE 1

Manufacture of Polymer Blends II

| | Examples | | | |
|---|---|---|---|---|
| | 1 | 2 | 3 | 4 |
| Conditions in the second polymerization stage: | | | | |
| Pressure [bar] | 20 | 20 | 20 | 15 |
| Temperature [°C.] | 70 | 80 | 70 | 70 |
| Partial pressure ratio propylene:ethylene | 2.3:1 | 2.3:1 | 2.3:1 | 2.3:1 |
| Ethylene content of propylene/ethylene copolymer b) [% w/w] | 50 | 50 | 50 | 50 |
| Ratio of monomer convtd. in first stage to monomer convtd. in second stage, by weight | 1.9:1 | 1.7:1 | 1:1 | 4:1 |
| Molar ratio aluminum compound:isopropanol | 1.1:1 | 2:1 | 5:1 | 0.77:1 |
| Melt flow index*) of propylene homopolymer c) obtained after first stage | 15.7 | 29.1 | 15.0 | 20.1 |
| Melt flow index*) of polymer blend II obtained after second stage | 2.6 | 9.5 | 2.9 | 3.8 |

*determined as specified in DIN 53,735 at 230° C. under a load of 2.16 kg

B. Blending of the polymer blends obtained in Examples 1 to 4 with appropriate propylene homopolymers a)

The blends II produced in Examples 1 to 4 were reacted with the appropriate propylene homopolymers a) at 220° C. in a Werner & Pfleiderer twin-screw extruder ZSK 30 or ZSK 40 over a residence period of about 3 minutes.

Table 2 below lists the polymers used, the melt flow indices of the propylene homopolymers a) added, the quantities of propylene homopolymers a) and c) and of the propylene/ethylene copolymers b) used in the blends of the invention.

TABLE 2

Blends of Polymer Blends II with Propylene Homopolymers a)

| | Examples | | | | | | | | | | | | | |
|---|---|---|---|---|---|---|---|---|---|---|---|---|---|---|
| | 1/1 | 1/2 | 1/3 | 1/4 | 2/1 | 2/2 | 2/3 | 2/4 | 3/1 | 3/2 | 3/3 | 3/4 | 4/1 | 4/2 |
| Polymer blend II used, as described in A of Example: | 1 | 1 | 1 | 1 | 2 | 2 | 2 | 2 | 3 | 3 | 3 | 3 | 4 | 4 |
| Melt flow index of propylene homopolymer a) (g/10 min)* | 0.05 | 0.15 | 0.05 | 0.15 | 0.05 | 0.15 | 0.05 | 0.15 | 0.05 | 0.15 | 0.05 | 0.15 | 0.05 | 0.15 |
| Amount of propylene | 46.3 | 46.3 | 55.4 | 55.4 | 47.1 | 47.1 | 57.1 | 57.1 | 33.3 | 33.3 | 60.0 | 60.0 | 24.2 | 24.2 |

TABLE 2-continued

| | Blends of Polymer Blends II with Propylene Homopolymers a) | | | | | | | | | | | | | |
|---|---|---|---|---|---|---|---|---|---|---|---|---|---|---|
| | Examples | | | | | | | | | | | | | |
| | 1/1 | 1/2 | 1/3 | 1/4 | 2/1 | 2/2 | 2/3 | 2/4 | 3/1 | 3/2 | 3/3 | 3/4 | 4/1 | 4/2 |
| homopolymer a) (% w/w) Amount of propylene | 35.2 | 35.2 | 29.2 | 29.2 | 33.3 | 33.3 | 27.0 | 27.0 | 33.3 | 33.3 | 20.0 | 20.0 | 60.6 | 60.0 |
| homopolymer c) (% w/w) Amount of propylene | 81.5 | 81.5 | 84.6 | 84.6 | 80.4 | 80.4 | 84.1 | 84.1 | 66.7 | 66.7 | 80.0 | 80.0 | 84.8 | 84.8 |
| homopolymers a) + c) (% w/w) Amount of propylene/ethylene | 18.5 | 18.5 | 15.4 | 15.4 | 19.6 | 19.6 | 15.9 | 15.9 | 33.3 | 33.3 | 20.0 | 20.0 | 15.2 | 15.2 |
| copolymer b) (% w/w) Units of propylene homopolymer a) per unit of propylene homopolymer c) | 1.3 | 1.3 | 1.9 | 1.9 | 1.4 | 1.4 | 2.1 | 2.1 | 1 | 1 | 3 | 3 | 0.4 | 0.4 |

*determined as specified in DIN 53,735 at 230° C. under a load of 2.16 kg

The properties of the blends of the invention, composed of different propylene polymers as obtained in Examples 1/1 to 1/4, 2/1 to 2/4, 3/1 to 3/4, and 4/1 and 4/2, i.e. their melt flow indices and rigidity values, and the results of an injection spiral flow test are listed in Table 3 below.

TABLE 3

Properties of Blends of the Invention

| Example | Melt flow index [1] [g/10 min] | Rigidity [2] [N/mm$^2$] | Injection Spiral Flow Test [3] [cm] at | | |
|---|---|---|---|---|---|
| | | | 220° C. | 250° C. | 280° C. |
| 1/1 | 0.3 | 490 | 18.0 | 24.5 | 38.5 |
| 1/2 | 0.6 | 500 | 20.0 | 27.0 | 40.5 |
| 1/3 | 0.3 | 550 | 15.5 | 20.5 | 35.0 |
| 1/4 | 0.4 | 550 | 18.5 | 25.5 | 38.5 |
| 2/1 | 0.5 | 510 | 19.5 | 26.0 | 43.0 |
| 2/2 | 1.2 | 510 | 21.5 | 29.5 | 45.5 |
| 2/3 | 0.6 | 540 | 18.5 | 26.0 | 44.5 |
| 2/4 | 0.7 | 545 | 19.5 | 26.5 | 42.5 |
| 3/1 | 0.9 | 340 | | 27.0 | |
| 3/2 | 1.0 | 330 | | 28.5 | |
| 3/3 | <0.3 | 500 | | 16.5 | |
| 3/4 | <0.3 | 490 | | 17.5 | |
| 4/1 | 1.8 | 580 | | 37.0 | |
| 4/2 | 1.9 | 585 | | 38.5 | |

[1] determined as specified in DIN 53,735 at 230° C. under a load of 2.16 kg
[2] determined as specified in DIN 53,445
[3] The injection spiral flow test used to measure the flow behavior of the blends consisted in injecting the test polymer, at the temperatures stated, into an injeection molding machine (Windsor Sp 130) having a screw diameter of 42 mm and a nozzle bore of 3 mm in diameter, from which it was injection molded at a screw speed of 100 revolutions per minute for 16 seconds. The polymer was then cooled for 6 seconds.

The measure of flow was taken to be the length of spiral filed with the test polymer.

II Manufacture of Blends of the Invention by a Three-stage Polymerization Process Examples 5 and 6

In these Examples, the blends of the invention were produced in a stirred autoclave having a capacity of 10 l using a Ziegler-Natta catalyst system consisting of the following catalyst components: 200 mg/h of the same titaniferous solid component as used in Examples 1 to 4, 10 mmoles/h of triethylaluminum, and 1 mmole/h of dimethoxyisobutylisopropyl-silane.

In the first polymerization stage of both Examples 5 and 6, propylene was polymerized at a temperature of 70° C. and a pressure of 28 bar with the aid of the aforementioned Ziegler-Natta catalyst system.

On completion of the reaction in the first polymerization stage, the stirred autoclave was depressurized to 10 bar, after which propylene was again polymerized therein in the presence of 30 l of hydrogen at a temperature of 70° C. and under a pressure of 28 bar. The polypropylene formed in the first polymerization stage remained in the autoclave, together with the Ziegler-Natta catalyst, during the second polymerization stage.

Following this second homopolymerization of propylene, the stirred autoclave was again depressurized—to 4 bar— and a mixture of ethylene and propylene was then polymerized therein in the presence of the propylene homopolymers already formed and the Ziegler-Natta catalyst. The temperature in this third polymerization stage was 70° C. and the pressure 8 bar.

The residence times in each of the three polymerization stages of Examples 5 and 6 are listed in Table 4 below, as are also the ratio of the weight of monomer converted in the first polymerization stage to that of monomer converted in the second polymerization stage and the ratio of the weight of monomer converted in the first two stages to that of monomer converted in the third stage and the ratio of the partial pressure of the propylene to that of the ethylene in the third polymerization stage.

Comparative Examples A and B

In a manner similar to that described in Examples 5 and 6, propylene was first of all polymerized in the presence of hydrogen, after which, in a second polymerization stage, propylene and ethylene were copolymerized. No polymerization of propylene in the absence of hydrogen was carried out. Unlike Examples 5 and 6 relating to the invention, the polymerization in the first polymerization stage was carried out in the presence of hydrogen (11.4 liters in Comparative Example A and 7.1 liters in Comparative Example B), and the pressure used in the second polymerization stage was 8 bar. The remaining reaction conditions are given in Table 4 below.

TABLE 4

Manufacture of Blends of the Invention by a Three-stage Polymerization Process

|  | Examples | | Comparative Examples | |
|---|---|---|---|---|
|  | 5 | 6 | A | B |
| Average residence times [minutes] | | | | |
| in first polymerization stage | 30 | 45 | 120 | 120 |
| in second polymerization stage | 45 | 45 | 30 | 30 |
| in third polymerization stage | 35 | 35 | — | — |
| Ratio of monomer convtd. in first polymerization stage to that convtd. in second polymerization stage, by weight | 1:2 | 1:1.5 | 6:1 | 5.4:1 |
| Ratio of monomer convtd. in first two polymerization stages to that convtd. in third polymerization stage, by weight | 6.1:1 | 5.4:1 | — | — |
| Partial pressure ratio propylene:ethylene in third polymerization stage | 1:2 | 1:2 | — | — |
| Partial pressure ratio propylene:ethylene in second polymerization stage | — | — | 1.2 | 1.2 |
| Ethylene content of propylene/ethylene copolymer b) [% w/w] | 50 | 50 | 50 | 50 |

The properties of the blends thus obtained in Examples 5 and 6 of the invention and Comparative Examples A and B are listed in Table 5 below.

TABLE 5

Properties of Resulting Blends

|  | Examples | | Comparative Examples | |
|---|---|---|---|---|
|  | 5 | 6 | A | B |
| Melt flow index [g/10 min] [1] | | | | |
| after first stage | <0.3 | <0.3 | 5.1 | 3.1 |
| after second stage | 5.0 | 3.0 | 4.8 | 2.5 |
| after third stage | 4.7 | 2.5 | — | — |
| Rigidity [N/mm²] [2] | 630 | 570 | 620 | 570 |
| Injection spiral flow test [3] | 62.0 | 53.5 | 46.5 | 36.5 |

[1] determined as specified in DIN 53,735 at 230° C. under a load of 2.16 kg

[2] determined as specified in DIN 53,445

[3] determined at 250° C., cf. Table 3

We claim:

1. A process for the preparation of a blend of different propylene polymers containing a) a propylene homopolymer having a melt flow index of from 0.001 to 5 g/10 min, as determined at 230° C. under a load of 2.16 kg, b) a propylene/ethylene copolymer having an ethylene content of from 5 to 80% w/w, and c) a propylene homopolymer having a melt flow index of from 1 to $10^4$ g/10 min, as determined at 230° C. under a load of 2.16 kg, provided that the ratio of the melt flow index of the propylene homopolymer c) to that of the propylene homopolymer a) is within the range 10:1 to $10^7$:1 wherein a propylene homopolymer a) is blended with a propylene/ethylene copolymer b) and a propylene homopolymer c) at a temperature of from 30° to 280° C. and under a pressure of from 1 to 100 bar and wherein for the preparation of the propylene polymers Ziegler-Natta catalysts are used which consist of a solid component, which contains titanium, magnesium, a halogen and an electron donating compound, an aluminum component and a further electron donating component.

2. A process for the preparation of a blend of different propylene polymers as defined in claim 1, wherein a polymer blend consisting of a propylene homopolymer a) and a propylene/ethylene copolymer b) is blended with a propylene homopolymer c) at a temperature of from 30° to 280° C. and under a pressure of from 1 to 100 bar.

3. A process for the preparation of a blend of different propylene polymers as defined in claim 1, wherein a polymer blend consisting of a propylene homopolymer c) and a propylene/ethylene copolymer b) is blended with a propylene homopolymer a) at a temperature of from 30° to 280° C. and under a pressure of from 1 to 100 bar.

* * * * *